United States Patent [19]
Kraemling et al.

[11] Patent Number: 6,010,775
[45] Date of Patent: Jan. 4, 2000

[54] LAMINATED PANE WITH LOW ENERGY TRANSMISSION

[75] Inventors: Franz Kraemling; Helmer Raedisch, both of Aachen; Heinz Schilde, Wuerselen, all of Germany

[73] Assignee: Saint-Gobain Vitrage, Courbevoie, France

[21] Appl. No.: 09/150,301

[22] Filed: Sep. 9, 1998

Related U.S. Application Data

[63] Continuation of application No. 08/492,448, Jun. 19, 1995, Pat. No. 5,849,402.

[30] Foreign Application Priority Data

Jun. 17, 1994 [FR] France ................................. 94 07486

[51] Int. Cl.$^7$ ..................................................... B32B 17/10
[52] U.S. Cl. ......................... 428/220; 296/77.1; 296/215; 428/332; 428/337; 428/436; 428/437; 501/70
[58] Field of Search ................................. 296/77.1, 215; 428/220, 332, 337, 436, 437; 501/70

[56] References Cited

U.S. PATENT DOCUMENTS

| | | | |
|---|---|---|---|
| 3,008,858 | 11/1961 | Blake et al. | 428/437 |
| 4,112,171 | 9/1978 | Motter et al. | 428/213 |
| 5,077,133 | 12/1991 | Cheng | 428/426 |

*Primary Examiner*—D. S. Nakarani
*Attorney, Agent, or Firm*—Oblon, Spivak, McClelland, Maier & Neustadt, P.C.

[57] ABSTRACT

A pane with low energy transmission. The pane has a laminated structure of at least one glass sheet tinted in its mass and preferably having antisolar properties, and at least one sheet of polymer material containing a UV-absorbent, the at least one glass sheet and at least one sheet of polymer material being chosen to give a light transmission factor $TL_A$ of less than 60%, an energy transmission factor TE such that the ratio $TL_A/TE$ is greater than 1 and a transmission factor TUV less than 0.5%, the total thickness of the pane being preferably between 2.5 and 8 mm. The application of the pane, notably, as a lateral pane, rear window pane, roof or sun roof for transportation vehicle is disclosed.

15 Claims, No Drawings

LAMINATED PANE WITH LOW ENERGY TRANSMISSION

This application is a Continuation of application Ser. No. 08/492,448, filed on Jun. 19, 1995, now U.S. Pat. No. 5,849,402.

BACKGROUND OF THE INVENTION

Field of the Invention

The present invention concerns a laminated pane, more especially a laminated pane having low energy transmission and which can be used as a roof or sun roof for an automobile, or as a lateral or rear window pane.

Automobile manufacturers are increasingly proposing to equip their vehicles with a glass roof. This glass roof gives more light in the passenger compartment and produces, notably, the impression of driving with the roof open. The glazed area of the roof and, more generally, the glazed area of the whole vehicle has a tendency to increase on new models. This increase in glazing area raises several problems.

One problem is the increased heating of the passenger compartment due to the greenhouse effect and the action of bright sunlight. Another problem concerns the mechanical strength of the passenger compartment, in particular the maintenance of the rigidity of this compartment normally and under stress. The problem of safety also arises in an accident, notably, ejection through the lateral panes, the rear window and also the glass roof.

For reducing the greenhouse effect, there has already been proposed, according to EP 0 452 207, a pane used, notably, an in opening roof for an automobile vehicle, formed from a glass colored in its mass which has, for a thickness of 3.85 mm, a total light transmission factor under illuminant A ($TL_A$) equal to or less than approximately 20% and a total energy transmission factor (TE) less than or equal to approximately 12%. This pane, when used in monolithic form, is satisfactory in regard to thermal comfort. It does not, however, provide a satisfactory solution to the other problems mentioned above.

OBJECTS OF THE INVENTION

For solving, at the same time, the problem of the greenhouse effect, the problem of retaining mechanical properties, notably the rigidity of the passenger compartment of the vehicle, and the safety problems mentioned above, the present invention provides a laminated pane comprising at least one sheet of tinted glass and at least one sheet of plastic material containing a UV-radiation absorbing agent, the glass sheet or sheets and the plastic sheet or sheets being selected to give, when laminated, a light transmission factor $TL_A$ less than 60% and an energy transmission factor TE such that the ratio $TL_A/TE$ is greater than 1, and also a transmission factor in the ultraviolet (TUV) less than 0.5%, the total thickness of the laminated pane being from 2.5 to 8 mm.

The laminated structure according to the present invention, in addition to its optical and thermal characteristics, has excellent mechanical properties including resistance to impact and to penetration, and anti-ejection properties in the case of an accident. It also ensures that the rigidity of the passenger compartment is maintained.

DETAILED DESCRIPTION OF THE PREFERRED EMBODIMENTS

In one embodiment of the invention laminated pane the pane is constituted of two glass sheets and one intermediate sheet. In this embodiment, one or preferably both of the glass sheets are produced from a silico-sodo-calcic glass preferably tinted within or throughout its mass, notably by iron oxides, this glass possessing, preferably, IR radiation absorption properties and, more generally, antisolar functionality.

This tinted glass may be a glass of the formulae described, for example, in EP-A-0 353 140 incorporated herein by reference. This glass contains iron oxides in proportions of 0.55 to 0.95% by weight of $Fe_2O_3$ total and from 0.11 to 0.22% by weight of FeO, giving a ratio $FeO/Fe_2O_3$ total of 0.19 to 0.35. This glass has a high transmission factor $TL_A$, generally greater than 70%, and its $TL_A/TE$ ratio is generally higher than 1.3.

To obtain the light transmission desired according to the present invention (i.e., less than 60%), the one or more tinted glass sheets are associated with at least one optionally tinted intermediate sheet, preferably a sheet of tinted polyvinyl butyral (PVB), which in addition contains at least one UV-absorbing agent so as to give a TUV factor of less than 0.5% and preferably less than 0.1% for the pane as a whole. A suitable PVB sheet is, for example, a sheet sold commercially under the trade name SAFLEX by the Monsanto company, or a PVB sheet sold commercially under the trade name BUTACITE by Du Pont De Nemours. Suitable plastic, preferably PVB, sheets have a factor $TL_A$ less than 60% and a factor TE such that the ratio $TL_A/TE$ of the pane will be higher than 1.

In another preferred embodiment of the invention it is possible to use, as tinted glass sheet, at least one glass sheet produced from a composition of silico-sodo-calcic glass which comprises, expressed in percentages by weight, from 0.75 to 1.4% total iron expressed in the form $Fe_2O_3$, from 0.25 to 0.32% of ferrous iron expressed in the form FeO and which has, for a thickness of from approximately 3 to 3.3 millimeters, a total light transmission factor under illuminant A ($T_{LA}$) of at least 70%, a total energy transmission factor ($T_E$) less than 46% and a transmission factor for ultraviolet radiation less than approximately 25%.

The light transmission and energy transmission values according to the invention are determined according to the Parry Moon Mass, 2 method; the transmission in the ultraviolet is determined by the method defined by standard ISO 9050.

The invention glasses may be produced from common raw materials in conventional furnaces used within the framework of the float glass technique. The melting and refining of these glasses takes place in flame furnaces provided, if desired, with electrodes assuring the heating of the glass in the mass by passage of an electrical current between said electrodes. The degree of oxido-reduction of these glasses is controlled by means of oxidizing agents, such as sodium sulphate, and reducing agents such as coke. The quantity of sodium sulphate introduced into the vitrifiable mixture, taking into account the characteristics of the furnace in which this mixture is melted, is such that the $SO_3$ content in the glass is generally from 0.10 to 0.35 wt. %.

The content of reducing agents associated with the sulphate, taking into account also the characteristics of the furnace for production of the glass, is calculated in such a way that the oxido-reduction degree of said glass is preferably kept between precise limits. These limits are defined by the extreme values of the ratio between the quantity of ferrous iron expressed in the form FeO and the quantity of total iron expressed in the form $Fe_2O_3$. This ratio $FeO/Fe_2O_3$ varies in the present invention from 22 to 34 wt. %; it is preferably between 25 and 30 wt. %.

The glasses used in the variant described above are silico-sodo-calcic glasses, which preferably comprise the constituents listed below in the contents defined by the following limits, expressed in percentages by weight:

| | |
|---|---|
| $SiO_2$ | 64 to 75% |
| $Al_2O_3$ | 0 to 5% |
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ | 0.75 to 1.4% (total iron expressed in this form) |
| FeO | 0.25 to 0.32% |
| $SO_3$ | 0.10 to 0.35% |

These glasses may contain, in addition, other constituents considered as impurities and introduced indirectly by the vitrifiable raw materials used and/or by the glass cullet introduced into the vitrifiable mixture and containing a small quantity of coloring agents other than iron oxides. These impurities preferably represent less than 0.1% by weight of the glass; they are, for example, titanium, cobalt, nickel, chromium, selenium and/or manganese. The glasses according to the invention contain, preferably, from 0.8 to 1.3% of total iron expressed in the form $Fe_2O_3$.

Apart from the transmission characteristics referred to above, the glasses used in this embodiment of the present invention preferably have a tint tending towards the green. Their dominant wavelength under illuminant C is preferably generally between 490 and 505 nanometers. The use of these glasses is especially interesting in that they have a notable absorption of infrared and ultraviolet radiation at relatively small thicknesses.

In a further variant of the present invention, it is possible to use, as tinted glass sheet(s) for the production of an invention laminated pane, at least one sheet of glass produced from a silico-sodo-calcic glass composition which comprises the constituents given below with the contents expressed in percentages by weight, defined by the following limits:

| | |
|---|---|
| $SiO_2$ | 69 to 75% |
| $Al_2O_3$ | 0 to 3% |
| CaO | 2 to 10% |
| MgO | 0 to 2% |
| $Na_2O$ | 9 to 17% |
| $K_2O$ | 0 to 8% |
| $Fe_2O_3$ (total iron) | 0.2 to 1.5% | these compositions being likely to contain, also, fluorine, oxides of zinc, zirconium, cerium, titanium and less than 4% of barium oxide, the total of the percentages of the alkaline-earth oxides remaining equal to or less than 10%.

In this glass composition, which will be termed here "amagnesian" glass, the silica is kept within relatively narrow limits for the following reasons:

above approximately 75%, the viscosity of the glass and its tendency toward devitrification increase strongly, which makes it much more difficult to melt and to pour onto a tin bath, below 69%, the hydrolytic resistance of the glass decreases very rapidly and the transmission in the visible range also decreases.

This reduction in the hydrolytic resistance of the glass can be compensated, at least partly, by the introduction of $Al_2O_3$, but this oxide contributes to the increase in its viscosity and to a reduction in the transmission in the visible range; it can therefore be used only in a very limited quantity.

The alkaline oxides $Na_2O$ and $K_2O$ enable the melting of the glass to be facilitated and its viscosity at high temperature to be adjusted, in order to keep the viscosity close to that of a standard glass. $K_2O$ may be used up to approximately 8%. Above this percentage, the increase in the cost of the composition becomes an economic disadvantage. Furthermore, the increase in the percentage of $K_2O$ can only be made, essentially, at the expense of $Na_2O$, which can contribute to an increase in the viscosity. Nevertheless, in specific conditions the presence of $K_2O$ enables the absorption of the glass in the infrared to be increased.

The alkaline-earth oxides play a determining role in achieving the properties of the glasses used in this variant of the invention. It has, in fact, been found that the limitation of the percentage of MgO to 2% and, preferably, its elimination in the glasses used here enable their absorption capacity in the infrared to be increased. The elimination of MgO, which exerts an important influence upon the viscosity, may be compensated at least partly by an increase in $Na_2O$.

CaO should be limited to 10%; above this value, the tendency of the glass toward devitrification increases too rapidly. BaO can be added in the compositions used in the present case in contents lower than 4%. In fact, BaO has a much smaller influence than MgO and CaO upon the viscosity of the glass. The increase in BaO takes place, essentially at the expense of the alkaline oxides, of MgO and particularly of CaO. Any large increase in BaO therefore contributes to increasing the viscosity of the glass, notably at low temperatures. In addition, the introduction of a high percentage of BaO substantially increases the cost of the composition and has a tendency to reduce the hydrolytic resistance of the glass.

In addition to these considerations it must be added that the introduction of a small percentage of BaO into a glass containing little and, preferably, no MgO, enables the absorption of infrared radiation to be further increased. To obtain the desired transmission properties, it is necessary to limit the total of the percentages of MgO, CaO and BaO to a value equal to or less than 10%.

The glasses used here according to this invention also contain iron oxides, the contents of which are expressed in total in the form $Fe_2O_3$ (total iron).

The glasses used here may also contain up to 1% of other constituents provided by the vitrifiable materials.

A series of preferred compositions of "amagnesian" glass which may be used in this invention comprises the constituents listed below within the following limits by weight:

| | |
|---|---|
| $SiO_2$ | 71 to 75% |
| $Al_2O_3$ | 0 to 3% |
| CaO | 6 to 10% |
| $Na_2O$ | 12 to 17% |
| $Fe_2O_3$ (total iron) | 0.2 to 1.5% |

These glasses are, preferably, devoid of MgO; they are, if desired, devoid of $K_2O$. The term devoid is to be understood as meaning that there glasses may perhaps contain a very small quantity of the oxides concerned which may be provided by the impurities of a vitrifiable raw material or as a result of the introduction of cullet into the vitrifiable mixture.

Another series of preferred "amagnesian" glass compositions which may be used in this invention comprises the constituents listed below in the following limits by weight:

| | |
|---|---|
| $SiO_2$ | 69 to 74% |
| $Al_2O_3$ | 0 to 3% |
| CaO | 2 to 7% |
| $Na_2O$ | 10 to 15% |
| $K_2O$ | 2 to 7% |
| $Fe_2O_3$ (total iron) | 0.2 to 1.5% |

These glasses are preferably devoid of MgO.

When the glasses used here contain barium oxide, the percentage of this oxide is, preferably, between 0.5 and 3.5% by weight. The, glasses used here may contain also fluorine, preferably between 0.5 and 2% by weight. Apart from its well known action upon the fusion and viscosity of glass, this constituent has a specific influence upon the absorption of infrared radiation, an influence which is additive to the effect produced by the elimination of MgO and the introduction of $K_2O$ and BaO. This effect leads to a slight displacement of the absorption band maximum in the infrared, and to a straightening of the slope of said band at the end of the visible range near the infrared.

The glasses used here may also contain zinc oxide. This oxide enables the viscosity of the glass to be reduced if necessary and contributes to increasing the hydrolytic resistance of the glass and to reducing its tendency toward devitrification. This is the reason why ZnO is introduced preferably into the glasses used here containing a high percentage of silica and/or not containing alumina. The introduction of the zinc oxide may also prevent the appearance of an amber color. In order not to excessively increase the expense of the composition, Zno is introduced in proportions of between 0.5 and 3% by weight.

The glasses used here may also contain zirconium oxide. This oxide enables the glass to be stabilized and the chemical resistance of the glass, in particular its hydrolytic resistance, to be improved. This oxide is introduced, preferably, into the glasses containing little or no alumina in quantities which may reach 1.5% by weight. The glasses used may also contain cerium oxide for the purpose of increasing the absorption of the UV radiation. The glasses may contain up to 1.5% and, preferably; from 0.3 to 0.8% by weight of $Ce_2O_3$. The glasses used may contain also titanium oxide $TiO_2$ up to 1% by weight. This oxide enables the UV radiation to be absorbed in the same way as $Ce_2O_3$ which is, however, more expensive.

The "amagnesian" glasses used herein may be produced in conditions which enable the desired oxido-reduction degree to be achieved. Thus, the glasses may be produced using known refining agents, such as the sulphates, their redox being less than 0.35 and generally between 0.2 and 0.3. The glasses least rich in iron that are used may also be produced in the conditions described, for example, in Patent EP-B-297 404 incorporated herein by reference and may have a redox greater than 0.4 to 0.5; the redox of the glasses remains, however, below 0.8. The term redox is to be understood here as meaning the value of the ratio $FeO/Fe_2O_3$, where FeO represents the iron actually in the form of ferrous oxide, $Fe_2O_3$ being the quantity of total iron calculated in this form.

The total light and energy transmission factors of the glasses described above in this variant are such that the ratio $TL_A/T_E$ is generally equal to or greater than 1.65 and preferably equal to or greater than 1.70, the factor $TL_A$ being greater than 70%.

In another variant, the laminated pane of the invention uses, as glass sheet, a tinted glass having low light transmission, the composition of which comprises the constituents listed below in the proportions by weight defined by the following limits:

| | |
|---|---|
| $SiO_2$ | 64 to 75% |
| $Al_2O_3$ | 0 to 5% |
| $B_2O_3$ | 0 to 5% |
| CaO | 5 to 15% |
| MgO | 0 to 5% |
| $Na_2O$ | 10 to 18% |
| $K_2O$ | 0 to 5% | with CaO + Mgo between 6 and 16%, $Na_2O$ + $K_2O$ between 10 and 20% and, as coloring agents, from 1.4 to 4% iron oxide expressed in the form $Fe_2O_3$, and possibly cobalt oxide and/or chromium oxide, and/or selenium, the total of these other coloring agents being up to 2,400 ppm, which gives, for a thickness of 3.85 millimeters, a total light transmission $TL_A$ equal to or less than approximately 20% and a total energy transmission TE equal to or less than approximately 12%. Preferably, the cobalt oxide content may be as high as about 500 ppm and that of selenium approximately 50 ppm.

These glasses, described notably in publication EP-A-O 452,207 incorporated herein by reference, are preferably produced in conditions such that their redox, that is to say the ratio of the ferrous oxide to the total quantity of iron, both being expressed in the form of ferric oxide, remains equal to or less than approximately 0.40.

At least one of these glass sheets may be associated with an intermediate sheet containing at least one UV absorbing agent for the production of the pane according to this invention. This intermediate sheet may be colorless; given the low-value of the $TL_A$ of the glass. It may also be chosen to be colored if it is desired to attain a very dark pane.

In another variant of the present invention, it is also possible to use, as sheet(s) of tinted glass, (i.e., tinted in the mass), the glass described in publication EP-A-O 536 049, incorporated herein by reference, which comprises, as coloring agents, from 0.45 to 2.5% of $Fe_2O_3$ (total iron), 0.001 to 0.02% of CoO, from 0 to 0.0025% of Se and from 0 to 0.1% of $Cr_2O_3$, these glasses having a total energy transmission factor TE of between 10 and 48%, a $TL_A$ factor of from 20 to 60% for a thickness of 3.85 millimeters, the ratio $TL_A/TE$ being greater than 1.

The laminated pane according to the present invention provides an increased impression of comfort as a result of an optimized ratio between the incident light and the input of heat. In the application of the invention laminated pane as an automobile roof or sun roof, the pane according to this invention advantageously has a factor $TL_A$ of between 5% and 25%.

In a preferred embodiment, notably with regard to the comfort obtained, the constituent glass sheets and the intermediate layer or layers are chosen in such a way as to give a $TL_A$ less than 20%, a ratio $TL_A/TE$ higher than 1.2, for a total thickness of from 3 to 8 mm.

When used as a roof or sun roof for automobiles, and even with a large glazed area, the invention pane provides, in terms of thermal energy transfer characteristics, an amount of thermal energy very close to a conventional roof of coated plate metal.

In particular, when a vehicle equipped with a glass roof incorporating a pane according to this invention is situated in conditions of natural sunlight, it has a curve of temperature for the passenger compartment that is almost identical to the curve obtained for the passenger compartment of a vehicle not equipped with a pane according to this invention, situated in the same conditions of sunlight.

Another preferred characteristic of the pane according to this invention is a reflection factor lower than 6%. A low reflection factor gives greater driving comfort, particularly at night.

In the application of the invention pane as a lateral or rear window pane for an automobile vehicle the pane according to this invention advantageously has a $TL_A$ factor of from 20% to 55% for a thickness of from 2.5 to 5 mm.

According to another preferred embodiment according to this invention, the invention pane has the structure of an asymmetric pane, comprising a single glass sheet and a sheet of plastics material. Asymmetric panes are described, for example, in Patent Publications FR-A-2 398 606, EP-A-132 198, JP-A-86 177 241, JP-A-86 281 118, all incorporated herein by reference. Suitable asymmetric panes falling within the scope of this invention are formed from a glass sheet having a $TL_A$/TE ratio higher than 1, as described above, and of a sheet of plastics material containing at least one UV-absorbing agent, where this sheet may be based upon at least one polyurethane film, the elements being chosen to achieve the desired characteristics in terms of the factors $TL_A$, TE, TUV.

Other advantages and characteristics of the invention will be apparent from the description given below of examples of panes according to this invention. These examples are not limiting, however.

EXAMPLE I

A pane for a motor vehicle roof, of approximately 1 m² area, is produced from two glass sheets of 3.15 mm thickness of a tinted silico-sodo-calcic glass containing coloring oxides, in a proportion expressed by weight relative to the total glassmaking composition as follows: 0.75 to 0.90% $Fe_2O_3$, 0.15 to 0.22% FeO, with $FeO/Fe_2O_3$ total= approximately 0.30, with a small proportion of CoO, less than 17 ppm.

This glass has, with a 3.85 mm thickness, a $TL_A$ of the order of 72% and a TE of the order of 44%, which leads to a ratio $TL_A$/TE of the order of 1.6.

The two glass sheets are assembled together by means of a tinted PVB sheet of 1.14 mm thickness. A suitable sheet is, for example, a sheet of PVB sold commercially under the trade name SAFLEX SR 654 400. This sheet contains UV-absorbing agents and has a TL of 40%, a TE of 48% and a TUV of 0% for a thickness of 0.38 mm.

The pane finally obtained has the following characteristics: $TL_A$ of 7%, TE of 6%, TUV of 0%.

EXAMPLE 2

A pane for a motor vehicle roof is produced of approximately 1 m² area, from two sheets of glass of 3 mm thickness of a highly tinted silico-sodo-calcic glass containing, as coloring agent, from 1.5 to 2.5% of iron oxide expressed in the form of $Fe_2O_3$ and from 180 to 300 ppm of cobalt oxide. The characteristics of the glass for a thickness of 3.85 mm are a $TL_A$ of 10% approximately and a TE of 5% approximately.

The two glass sheets are assembled together with an intermediate sheet of colorless PVB of 0.76 mm thickness, containing UV-absorbing agents, its TUV being 0%. The finally obtained pane has the following characteristic: $TL_A$ of 4%, TE of 2%, TUV of 0%.

EXAMPLE 3

A pane for a vehicle roof is manufactured from two sheets of glass of 2.1 mm thickness, as described in Example 2, and of one intermediate sheet of 0.76 mm thickness of colored PVB having a TL of 40%, a TE of 48% and a TUV of 0% for a thickness of 0.38 mm.

The finally obtained pane has a TL of 5%, a TE of 2% and a TUV of 0%.

EXAMPLE 4

A pane for a rear lateral window for a motor vehicle is produced by assembling together two sheets of glass of a composition as described in Example 1, of 2 mm thickness, and one intermediate sheet of 0.38 mm thickness of colored PVB as described in Example 1.

A laminated pane is finally obtained, having the following characteristics: $TL_A$ of 31%, TE of 25%, TUV of 0%.

It should be noted that the addition of a sheet of PVB does not cause the antisolar function of the glass sheets to be lost, as might be feared, that is the good ratio $TL_A$/TE, which remains greater than 1 and advantageously greater than 1.2.

The present invention demonstrates that by properly choosing a glass sheet or sheets having an appropriate antisolar function and a sheet or sheets of colored plastics material, as well as their number, one obtains a pane with a wide range of colors and shades while still maintaining a product having good antisolar properties. It is also possible, in this manner, to obtain a pane graduated in a single basic color, and within the framework of the equipment of an automobile vehicle, for example, to provide, starting from the lateral windows to the rear window, panes ranging from the lightest to the darkest. Single panes with different color are also possible.

This application is based on French patent application 94/07486 filed Jun. 17, 1994, incorporated herein by reference.

What is claimed as new and is desired to be secured by letters patent of the United States is:

1. A pane having a laminated structure, comprising at least one sheet of tinted glass, and at least one intermediate tinted sheet of polymeric material containing a UV-absorbing agent, said at least one sheet of glass and at least one intermediate tinted sheet of polymeric material being chosen such that said pane provides a light transmission factor $TL_A$ less than 60%, an energy transmission factor TE such that the ratio $TL_A$/TE shall be higher than 1, and a transmission factor TUV less than 0.5%, the total thickness of the pane being from 2.5 to 8 mm.

2. The pane according to claim 1, wherein the tinted glass is a silico-sodo-calcic glass containing, as colorant, iron oxides in proportions of 0.55 to 0.95% by weight of $Fe_2O_3$ and from 0.11 to 0.22% by weight of FeO, such that the ratio FeO/total $Fe_2O_3$ shall be about 0.19 to 0.35, and wherein the at least one sheet of polymeric material is a tinted sheet.

3. The pane according to claim 1, wherein the tinted glass is a silico-sodo-calcic glass which contains, expressed in percentages by weight, from 0.75 to 1.4% of total iron expressed in the form $Fe_2O_3$, from 0.25 to 0.32% of ferrous iron in the form of FeO, and which has, for a thickness of between approximately 3 and 3.3 millimeters, a total transmission factor under illuminant A of at least 70%, a total energy transmission factor less than about 46% and a transmission factor for ultraviolet radiation less than about 15%.

4. The pane according to claim 3, wherein the glass comprises the following constituents expressed in percentages by weight:

| | |
|---|---|
| $SiO_2$ | 64 to 75% |
| $Al_2O_3$ | 0 to 5% |

-continued

| | |
|---|---|
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ | 0.75 to 1.4% (total iron expressed in this form) |
| FeO | 0.25 to 0.32% |
| $SO_3$ | 0.10 to 0.35% | and, optionally, less than 0.1% of impurities.

5. The pane according to claim 1, wherein the tinted glass is a silico-sodo-calcic glass containing the following constituents expressed in percentages by weight:

| | |
|---|---|
| $SiO_2$ | 69 to 75% |
| $Al_2O_3$ | 0 to 3% |
| CaO | 2 to 10% |
| MgO | 0 to 2% |
| $Na_2O$ | 9 to 17% |
| $K_2O$ | 0 to 8% |
| $Fe_2O_3$ | 0.2 to 1.5% | optionally containing fluorine, oxides of zinc, zirconium, cerium, titanium and less than 4% of barium oxide, the total of the percentages of alkaline-earth oxides remaining equal to or less than 10%.

6. The pane according to claim 1, wherein the tinted glass is a silico-modo-calcic glass containing, as coloring agent, from 1.4 to 4% of iron oxide and wherein the factor $TL_A$ is equal to or less than 20% approximately and TE is equal to or less than approximately 12% and further wherein the polymeric material sheet is a sheet of tinted PVB.

7. The pane according to claim 1, wherein the tinted glass is a silico-sodo-calcic glass which contains, as coloring agents, from 0.45 to 2.5% of $Fe_2O_3$, from 0.001 to 0.02% of CoO, from 0 to 0.0025% of Se and from 0 to 0.1% of $Cr_2O_3$, these glasses having a total energy transmission factor TE of from 10 to 48% and a factor $TL_A$ of from 20 to 60% for a thickness of 3.85 mm, the ratio $TL_A/TE$ being greater than 1.

8. The pane according to claim 1, wherein said pane has a reflection factor less than 6%.

9. The pane according to claim 1, wherein said pane comprises two glass sheets and at least one intermediate tinted film.

10. The pane according to claim 9, wherein said pane's tint and its transmission factor $TL_A$ may be modified by a modification of at least one intermediate film.

11. The pane according to claim 1, comprising a single glass sheet and a sheet of tinted polymeric material which comprises at least two polymeric films.

12. The pane according to claim 1, characterized in that it has anti-ejection properties.

13. The pane according to claim 1, characterized in that it has burglar-resistant properties.

14. A vehicle comprising the pane according to claim 1 as a roof or part of a roof, the factor $TL_A$ being from 5 to 25%, the ratio $TL_A/TE$ being higher than 1.2.

15. A vehicle comprising the pane according to claim 1 as a rear lateral pane or rear window pane, the factor $TL_A$ being from 20 to 55%, and the ratio $TL_A/TE$ being higher than 1.2.

* * * * *